(12) United States Patent
Duchin et al.

(10) Patent No.: US 9,721,087 B1
(45) Date of Patent: Aug. 1, 2017

(54) USER AUTHENTICATION

(71) Applicant: EMC Corporation, Hopkinton, MA (US)

(72) Inventors: Zohar Duchin, Herzliya (IL); Alon Kaufman, Herut (IL); Marcelo Blatt, Modiin (IL); Yedidya Dotan, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/501,502

(22) Filed: Sep. 30, 2014

(51) Int. Cl.
*G06F 21/00* (2013.01)
*G06F 21/45* (2013.01)
*G06F 21/44* (2013.01)
*G06F 21/31* (2013.01)

(52) U.S. Cl.
CPC .............. *G06F 21/45* (2013.01); *G06F 21/31* (2013.01); *G06F 21/44* (2013.01)

(58) Field of Classification Search
None
See application file for complete search history.

(56) References Cited

U.S. PATENT DOCUMENTS

| | | | | |
|---|---|---|---|---|
| 2008/0034207 | A1* | 2/2008 | Cam-Winget | H04L 63/205 713/163 |
| 2008/0295157 | A1* | 11/2008 | Wong | H04L 9/32 726/5 |
| 2011/0047608 | A1* | 2/2011 | Levenberg | H04L 63/0807 726/7 |
| 2014/0230053 | A1* | 8/2014 | Mote | H04L 63/12 726/22 |

* cited by examiner

*Primary Examiner* — Hadi Armouche
*Assistant Examiner* — Andrew Steinle
(74) *Attorney, Agent, or Firm* — Krishnendu Gupta; Jason A. Reyes

(57) ABSTRACT

Disclosed herein are techniques for use in user authentication. In one embodiment, the technique comprises collecting information in connection with a plurality of authentication methods. The technique also comprises determining a score for each authentication method based on the collected information. The technique further comprises selecting an authentication method from the plurality of authentication methods based on the determined score.

3 Claims, 6 Drawing Sheets

USER AUTHENTICATION

TECHNICAL FIELD

The present invention relates generally to the field of authentication. More specifically, the invention relates to a method, an apparatus, and a computer program product for use in user authentication.

BACKGROUND OF THE INVENTION

Authentication systems aim to identify fraudulent users even though such users possess credentials to gain access to a legitimate user's account information. For example, each login attempt is received at a service provider at a particular time and in many cases, a fraudulent user will send login attempts at times outside of those expected by a service provider. Existing adaptive authentication techniques compare information associated with a login attempt, such as the time of the login and a location from where the login originated, with a historical record of a typical user who exhibits some expected login behavior. For example, if a high percentage of prior login attempts received by the service provider from a particular user occur between the hours of 6 AM and 11 PM daily and from locations within the continental United States, then login attempts between 2 AM and 4 AM from locations across Eastern Europe, have a high risk of being a fraudulent user.

The need for improved and comprehensive authentication systems is rising every day, for example, due to the increase in cybercrime and fraud. Many adaptive authentication systems employ a number of different authentication methods. Authentication methods include, for example, simple passwords, one-time passcodes, biometrics, tokens and certificates. Existing authentication systems select one or more suitable authentication methods based on usability and cost constraints. A need, though, remains for improved techniques for selecting a suitable authentication method among a plurality of available authentication methods.

SUMMARY OF THE INVENTION

There is disclosed a method, comprising: collecting information in connection with a plurality of authentication methods; based on the collected information, determining a score for each authentication method; and based on the determined score, selecting an authentication method from the plurality of authentication methods.

There is also disclosed an apparatus, comprising: at least one processing device, said at least one processing device comprising a processor coupled to a memory; wherein the apparatus is configured to: collect information in connection with a plurality of authentication methods; based on the collected information, determine a score for each authentication method; and based on the determined score, select an authentication method from the plurality of authentication methods.

There is further disclosed a computer program product having a non-transitory computer-readable medium storing instructions, the instructions, when carried out by one or more processors, causing the one or more processors to perform a method of: collecting information in connection with a plurality of authentication methods; based on the collected information, determining a score for each authentication method; and based on the determined score, selecting an authentication method from the plurality of authentication methods.

BRIEF DESCRIPTION OF THE DRAWINGS

The invention will be more clearly understood from the following description of preferred embodiments thereof, which are given by way of examples only, with reference to the accompanying drawings, in which.

DETAILED DESCRIPTION

Figure 1:
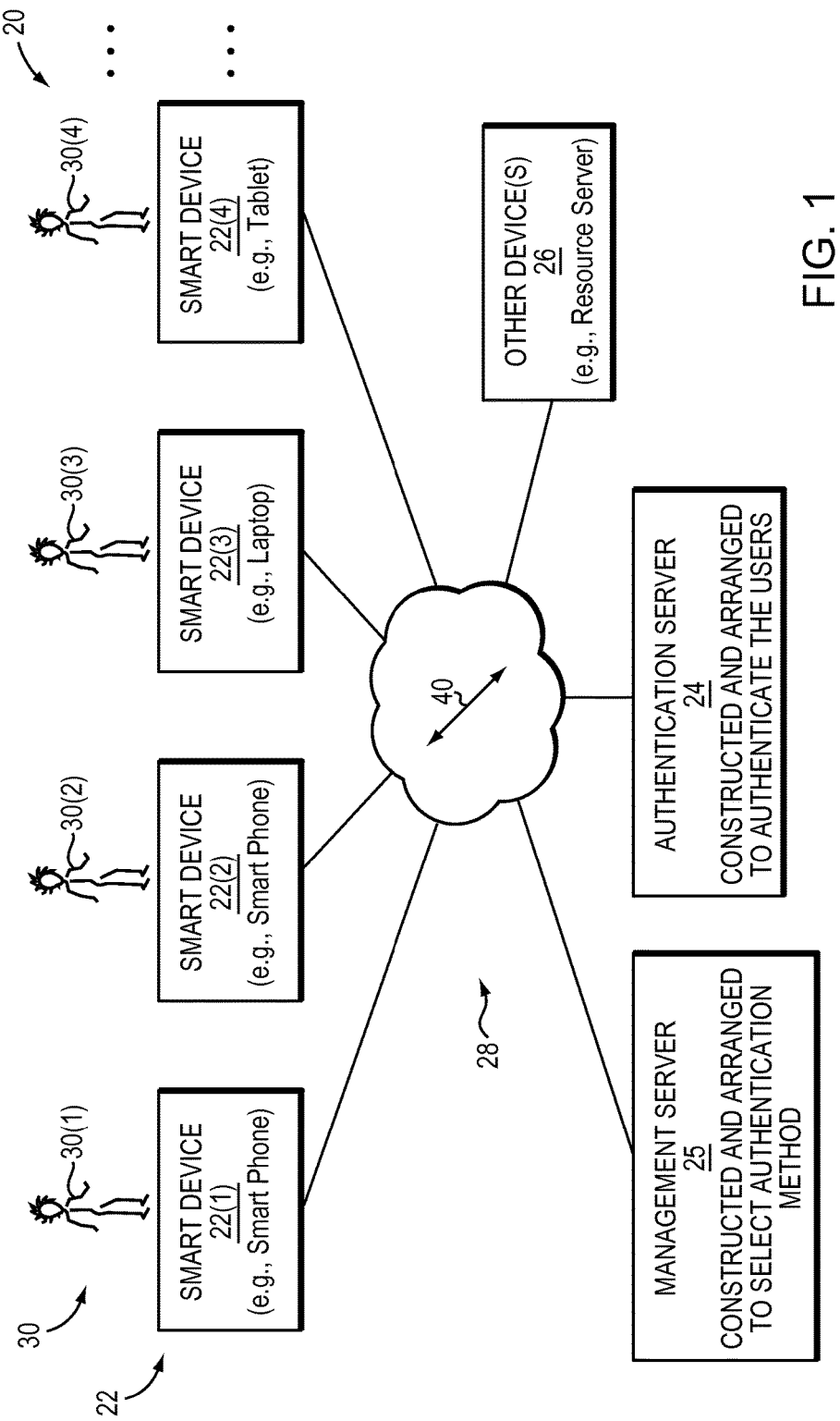
FIG. 1 is a block diagram of an electronic network which is suitable for use in authentication.

FIG. 1 shows an electronic network 20 for use in user authentication. The electronic network 20 includes smart devices 22(1), 22(2), 22(3), 22(4), . . . (collectively, smart devices 22), an authentication server 24, a management server 25, other device(s) 26, and a communications medium 28.

Each smart device 22 is controlled by a respective user 30. By way of example only, the smart device 22(1) may be a smart phone controlled by a user 30(1). Similarly, the smart device 22(2) may be another smart phone controlled by a user 30(2). Additionally, the smart device 22(3) may be a laptop controlled by a user 30(3). Furthermore, the smart device 22(4) may be a tablet controlled by a user 30(4), and so on.

The smart devices 22 are constructed and arranged to enable their respective users 30 to perform useful work (e.g., access files, use email, perform online transactions, play games, communicate with other users 30, etc.). During such activity, the users 30 will need to authenticate with the authentication server 24. As will be explained in further detail shortly, in order to successfully authenticate, the user 22 will have to satisfy an authentication method.

The management server 25 is constructed and arranged to select an authentication method. For example, if a user installs a new application on their device 22, the server 24 may select an authentication method and recommend an authentication method prior to a first attempt to authenticate. If the recommended authentication method is approved by the user, the server 25 notifies the authentication server 24 of the method. Otherwise, if not selected, the authentication server 24 proceeds with a default authentication method.

The authentication server 24 is constructed and arranged to authenticate the users 30. For example, the users 30 may need to successfully authenticate before obtaining access to protected resources on their respective smart devices 22, or on other external servers (e.g., see the other devices 26).

The other devices 26 represent additional apparatus on the electronic network 20 which may or may not be involved in authentication. For example, the other devices 26 may include resource servers which access the authentication server 24 to successfully authenticate users 30 prior to allowing the users 30 to access protected resources such as sensitive files and other content, email, VPN access, transactions, games, etc.

The communications medium 28 is constructed and arranged to connect the various components of the electronic network 20 together to enable these components to exchange electronic signals 40 (e.g., see the double arrow 40). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, SAN-based communications, cellular communications, combinations thereof, etc.

During operation, if a user installs a new application on their device, the management server 25 may recommend the most appropriate authentication method. The server 25 may determine the suitability of the authentication method based on a number of factors such as (i) rankings provided by other users relating to their user experience of the authentication methods, (ii) performance factors (e.g., fault rejection rate (FRR), fault approval rate (FAR), time-to-access, etc.) in connection with the authentication methods, (iii) the user (e.g., user works in a public place), (iv) the application (e.g., sensitivity of the application), and (v) the environmental surroundings of the device. Based on at least one of these factors, the server 25 determines a total score where a high score means that the authentication method is appropriate from a usability and security point of view. The server 25 then recommends the authentication method to the user. If the user selects the authentication method, the authentication method is communicated to the authentication server 24. If not selected, the authentication server 24 proceeds with a default authentication method.

Further, during operation, and after selection of the authentication method, the authentication server 24 receives authentication requests including at least one authentication factor (e.g., biometric factor, password, etc.) depending on the authentication method and performs authentication operations to authenticate the users 30. Such requests may be sent by the smart devices 22 directly to the authentication server 24 (e.g., the users 30 may be trying to access protected resources available locally on their smart devices 22). Such requests also may be sent from the other devices 26 (e.g., the users 30 may be trying to access protected resources available on protected resource servers using their smart devices 22, and the protected resource servers then communicate with the authentication server 24 to authenticate the users 30). In either case, if the authentication server 24 determines that the authentication factors are sufficient to satisfy the authenticate method then authentication is granted. If not, then authentication is rejected.

Figure 2A:
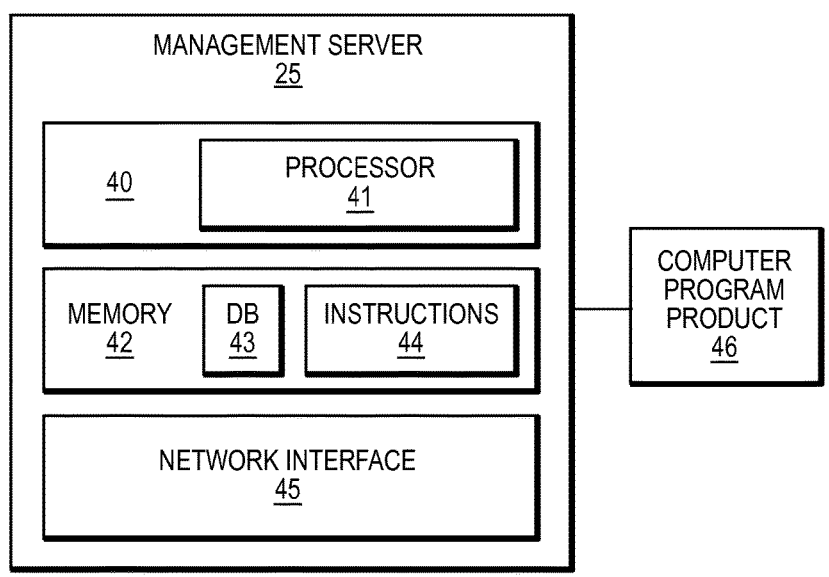
FIGS. 2(a) and (b) are block diagrams of electronic apparatus of the electronic network of FIG. 1.

FIG. 2(a) illustrates components of management server 25. The management server 25 includes a controller 40 which in turn includes a processor 41, a memory 42 and a network interface 45.

Memory 42 is configured to store code which includes instructions 44 to select an authentication method among a plurality of authentication methods. Memory 42 is further configured to include database 43 that includes information in connection with a plurality of authentication methods. The database 43 may also include information in connection with the users and the applications. Memory 42 generally takes the form of, e.g., random access memory, flash memory or a non-volatile memory.

Processor 41 can take the form of, but is not limited to, an Intel or AMD-based MPU, and can be a single or multi-core running single or multiple threads. Processor 41 is coupled to memory 42 and is configured to execute the instructions 44 stored in memory 42.

Network interface 45 is constructed and arranged to send and receive data over communications medium 28. In particular, network interface 45 is configured to send and receive communications from user devices 22.

In such an arrangements, the software instructions can be delivered to server 25 in the form of a computer program product (illustrated generally by code for computer program 46 stored within memory 42 in FIG. 2(a)) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

During operation, if a user installs an application on a user device 22, the user 30 may request or be given a recommendation of an authentication method to use in connection with the application. Processor 41 accesses database 43 and performs a computation that involves determining the score in order to select the most appropriate authentication method. This will be descried in further detail below. Once the authentication method has been selected, it is communicated to the user 30, and if the user approves the authentication method it is communicated to the authentication server 24.

Figure 2B:
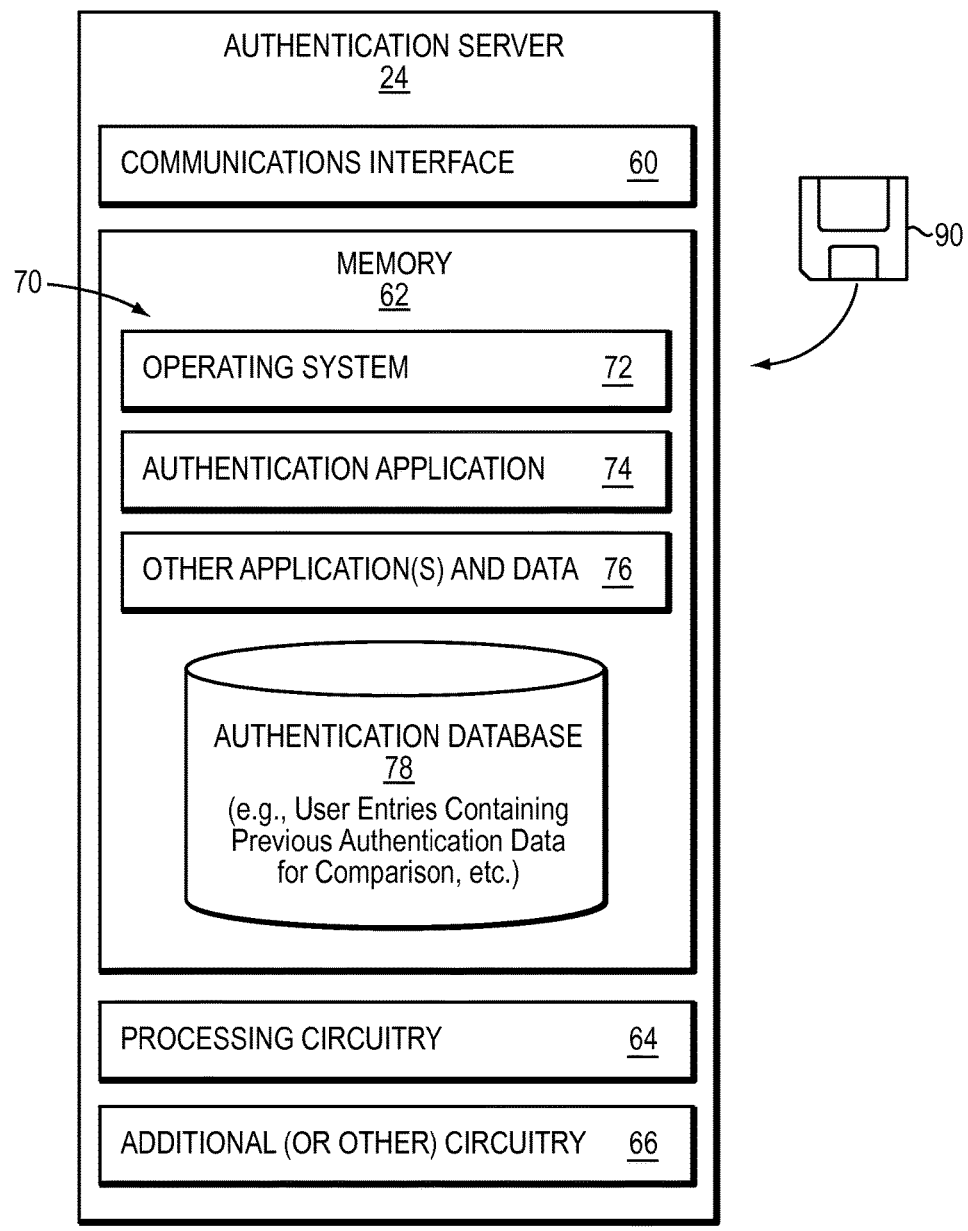

FIG. 2(b) shows particular details of the authentication server 24 (also see FIG. 1). The authentication server 24 includes a communications interface 60, memory 62, processing circuitry 64, and additional (or other) circuitry 66.

The communications interface 60 is constructed and arranged to connect the authentication server 24 to the communications medium 28 to enable communications with other components of the electronic network 20 (FIG. 1). Such communications may be IP-based, cellular-based, cable-based, combinations thereof, and so on. Accordingly, the communications interface 60 enables the authentication server 24 to communicate with the smart devices 22 and other devices 26 and the management server 25 in order to perform user authentication.

The memory 62 is intended to represent both volatile storage (e.g., DRAM, SRAM, etc.) and non-volatile storage (e.g., flash memory, etc.). The memory 62 stores a variety of software constructs 70 including an operating system 72 to manage resources of the authentication server 24, a specialized authentication application 74 to perform authentication, other applications and data 76 (e.g., authentication mechanisms, utilities, parameters and settings, etc.), and an authentication database 78 (e.g., user profiles containing user data for use during authentication).

The processing circuitry 64 is constructed and arranged to operate in accordance with the various software constructs 70 stored in the memory 62. Such circuitry 64 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 70 to the authentication server 24. The computer program product 90 has a non-transitory (or non-volatile) computer readable medium which stores a set of instructions which controls one or more operations of the authentication server 24. Examples of suitable computer readable storage media include tangible articles of manufacture and apparatus which store instructions in a non-volatile manner such as CD-ROM, flash memory, disk memory, tape memory, and the like.

The additional circuitry 66 represents other portions of the authentication server 24. For example, the authentication server 24 may include a user interface to enable a user such as an administrator to enter input and receive output (user I/O) to operate the authentication server 24.

During operation, the processing circuitry 64 runs the authentication application 74 to form specialized control circuitry which performs authentication operations to authenticate the users 30 of the smart devices 22. Such authentication may involve direct communication with the smart devices 22, or indirect communication via other devices such as resource servers (see other devices 26 in FIG. 1).

In particular, upon receipt of an authentication request, the control circuitry (i.e., the processing circuitry 64 executing the authentication application 74) obtains authentication factors depending on the authentication method and compares to stored data in the database 78. If the comparison is successful, authentication is granted. If comparison is unsuccessful, authentication is rejected.

Figure 3:
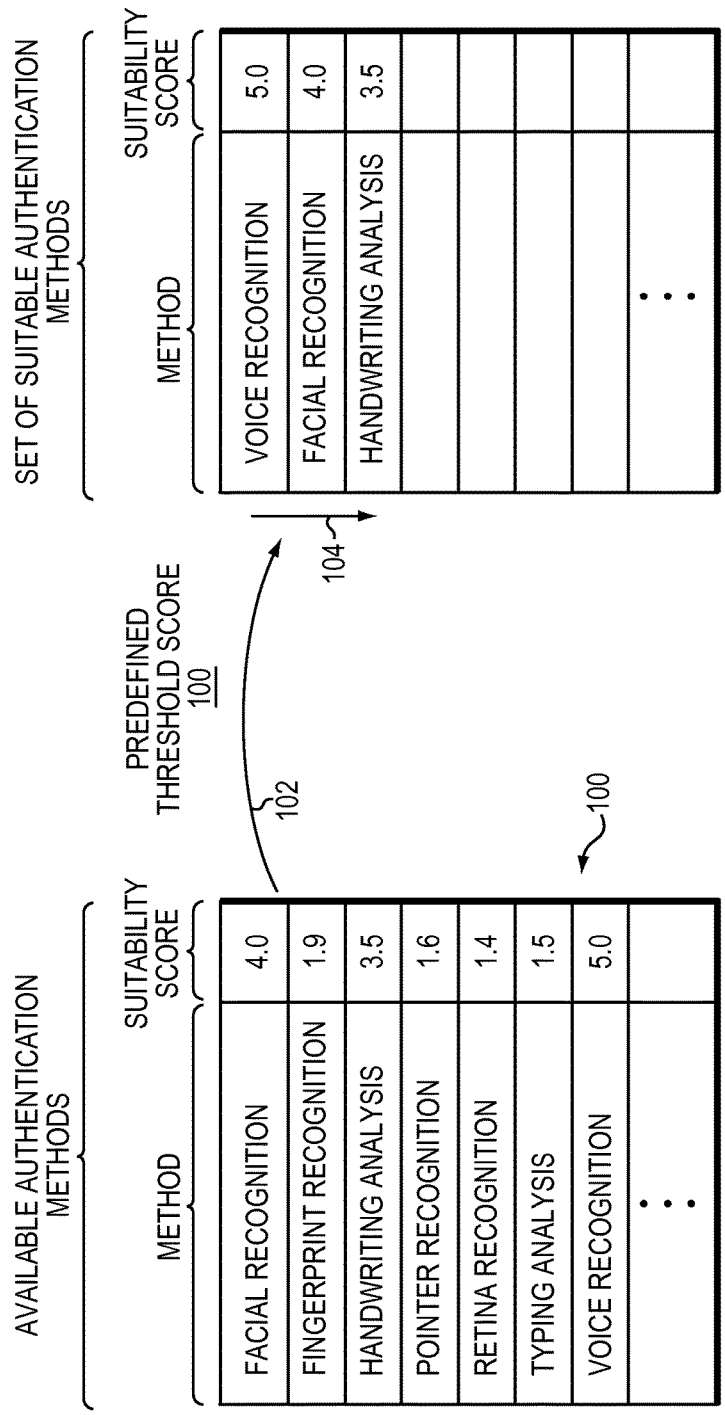
FIG. 3 is a block diagram illustrating score details in connection with authentication methods as determined by the electronic apparatus of FIG. 2(a).

FIG. 3 shows how the control circuitry of the management server 25 provides a set of suitable authentication methods from the available authentication methods. In this particular example, the authentication methods are biometric methods. Such operation involves the generation of scores for the various available biometric methods based on a set of factors.

As shown in FIG. 3, the management server 25 generates a suitability score based on factors (see arrow 100 in FIG. 3). By way of example, facial recognition, handwriting analysis, and voice recognition have relatively high suitability scores based on factors such as the particular user, user rankings of other users, and performance factors in connection with authentication methods. In contrast, fingerprint recognition, pointer recognition, retina recognition, and typing analysis have relatively low scores in this example. These lower scores may be due to a poor ranking or a poor performance in connection with these authentication methods. Also, the authentication methods may not be suitable for a particular user. For example, a voice authentication may not be suitable for a user working in a public place. In contrast, it may be suitable for a person working in a private space.

As further shown in FIG. 3, the scores of the biometric methods are compared to a predefined threshold score (see arrow 102 in FIG. 3). The predefined threshold score may be a normalized metric (e.g., the value "100") or tunable (e.g., over time to achieve the most accurate or satisfactory results). During such comparison, only biometric methods with scores that exceed the predefined threshold score are put in the set of suitable biometric methods. That is, biometric methods with scores that are less than the predefined threshold score are ruled out.

It should be noted that the authentication methods can be sorted based on score (see arrow 104 in FIG. 3). As a result, the management server is now able to select which authentication method to select as a suitable authentication methods. In this example, if the management server is configured to select the authentication method with the highest suitability score, the management server selects voice recognition as the most appropriate method.

Figure 4:
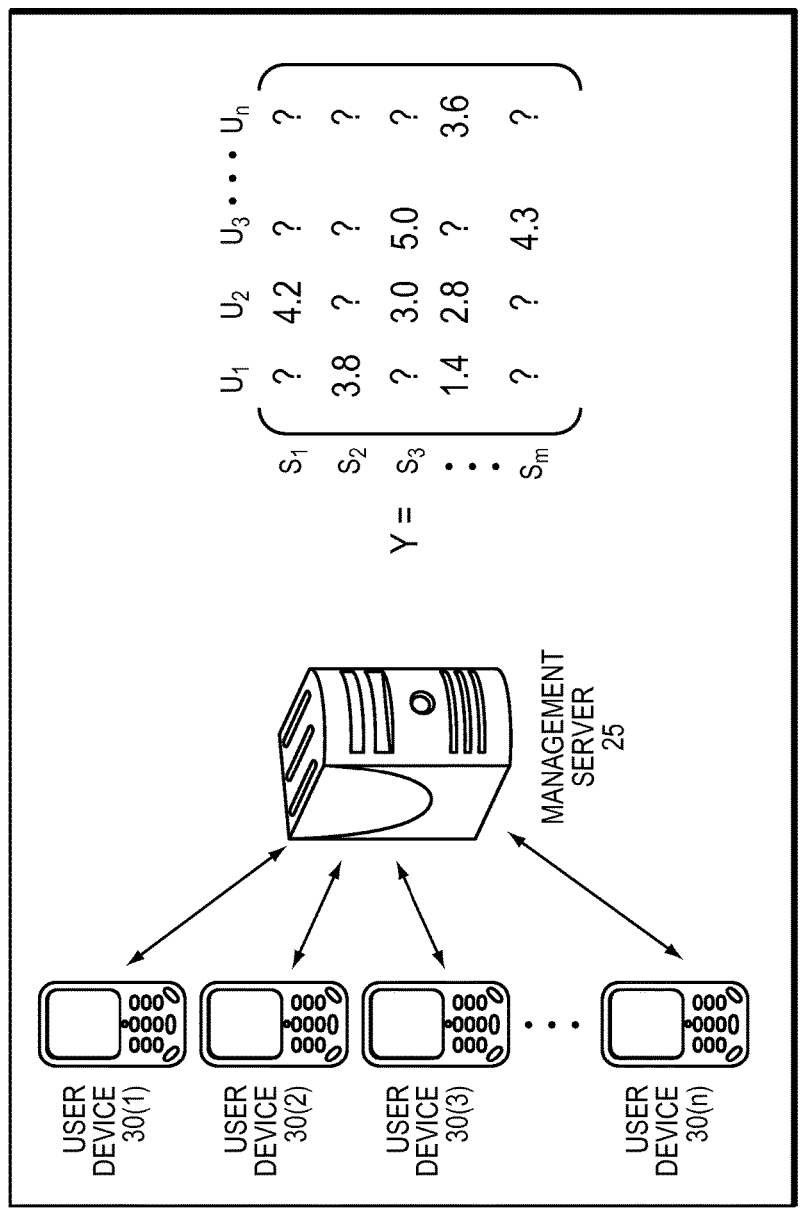
FIG. 4 is a block diagram of an example of the computation of the score details of FIG. 3.

Referring to FIG. 4, there is illustrated a diagram of how the data is collected and how ultimately the scores are determined in connection with the authentication methods. In this embodiment, all users denoted as "User 1", "User 2" and so on, post to a management server the selected authentication rule per application. In addition, over time the management server collects performance measures of each authentication rule for an application and construct a score that reflects how good that authentication rule of this application is for that user. Moreover, the management server can collect also the rating that users give to authentication methods based on their own experience. Using the information arranged in the form of user-item matrix, a collaborative filtering algorithm can be applied to predict the scores for every entry of matrix in a similar way that movies are being recommended to users based on other users recommendations.

Referring to the FIG. 4, there is shown a matrix where:
$U_i$—User i
$S_i$—Authentication rule i selected for an app
[Suppose that A is a group of all applications (A={$a_1$, $a_2$, . . . , $a_k$}) and R is a group of all possible authentication rules (R={$r_1$, $r_2$, . . . , $r_l$}), then S=A×R]
$Y^{(i,j)}$—The score that was calculated for user j (or rated by the user) when using authentication rule i (defined only when applicable).

Also, if the authentication method is selected using collaborative filtering, the following is applicable:
r(i,j)=1 if authentication rule i was rated by user j (0 otherwise)
$y^{(i,j)}$—rating of authentication rule i by user j (if defined)
$\theta^{(j)}$—feature vector of user j
$X^{(i)}$—feature vector of authentication rule i
For user j and authentication rule i, predict rating $(\theta^{(j)})^T X^{(i)}$ The cost function is:

$$J(X^{(1)}, X^{(2)}, \ldots, \theta^{(1)}, \theta^{(2)}, \ldots) = \frac{1}{2} \sum_{(i,j):r(i,j)=1} ((\theta^{(j)})^T X^{(i)} - y^{(i,j)})^2 + \frac{\lambda}{2} \sum_i \sum_k (X_k^{(i)})^2 + \frac{\lambda}{2} \sum_j \sum_k (\theta_k^{(j)})^2$$

The learning is done by finding values of θ and X that provide the minimum of the cost function J using $$\frac{\partial J}{\partial x} \text{ and } \frac{\partial J}{\partial \theta}$$

Figure 5:
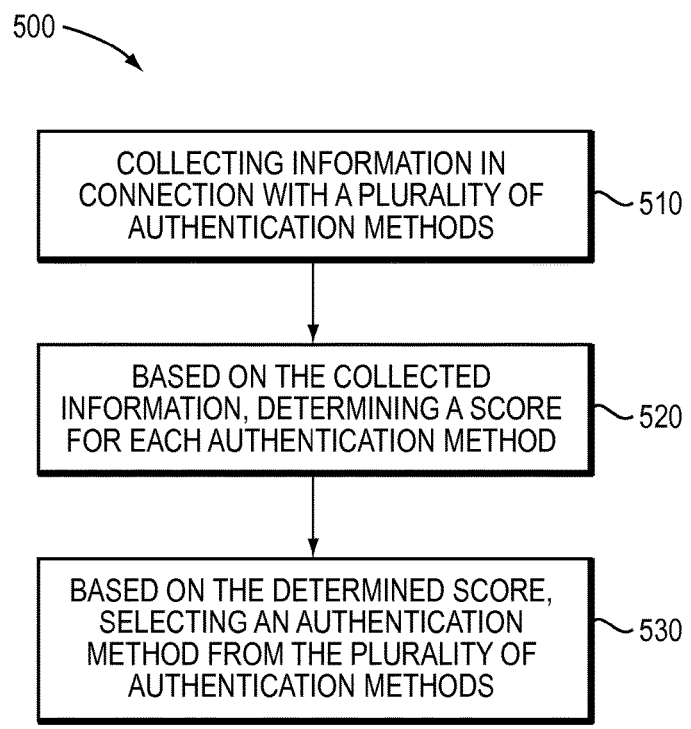
FIG. 5 is a flowchart of a procedure which is performed by the electronic apparatus of FIG. 2(a).

Referring to FIG. 5, there is illustrated a flow chart showing a method of carrying out the technique within the electronic environment shown in FIG. 1. In the flow diagram, the operations are summarized in individual blocks. The operations may be performed in hardware, or as processor-executable instructions that may be executed by a processor. Furthermore, the method 500 may, but need not necessarily, be implemented in the environment of FIG. 1.

At step 510, information is collected in connection with a plurality of authentication methods. The information may be performance information in connection with the authentication methods. Further, the information may be rankings from users of the authentication methods. At step 520, a score is determined for each authentication method based on the collected information. Also, it should be understood that the determined score may be dependent on the user and/or the application to which the authentication method will apply.

At step 530, an authentication method is selected from the plurality of authentication methods based on the determined score.

Advantageously, the suggested method assigns appropriate authentication methods to each and every user rather than rely on a predefined policy. For example, the suggested method may automatically identify that users that are frequent travelers that need a frequent access to a CRM application, prefer to authenticate using face recognition together with passcode rather than using voice biometrics. Although these two authentication rule (voice compared to face+passcode) may have similar security performance, their usability may be significantly different in a different context and different users. The suggested method can automatically identify this and provide the right policy to the right user in the right context.

The suggested authentication method also supports smooth introduction of new authentication methods and rules. In a use case where enterprises assign authentication rules to each application, as well as in a use case where users select their preferred authentication, the suggested method can provide an immediate feedback regarding the security and usability of the selected authentication rule. Instead of setting authentication rules in a trial and error manner with a long setup time, this method provides a way to avoid erroneous authentication from both usability and security points of view.

Also, the authentication method may dynamically change according to circumstances. For example, depending on the particular conditions of the immediate surrounding environment and how the smart device 22 is situated within that environment, the management server 25 may select particular authentications methods for use in authentication. It should be understood that the initial selection of the authentication method may no longer be suitable. It may now be more appropriate to select another authentication method based on environmental factors.

Environmental factors identify aspects of the environment in which the smart device 22 currently resides. To obtain environmental factors, the management server 25 may periodically direct the smart device 22 to activate particular capabilities for a short duration. For example, each camera of the smart device 22 may briefly activate to obtain a lighting measurement. Additionally, a microphone of the smart device 22 may briefly activate to obtain a sound level measurement. Furthermore, a movement sensor of the smart device 22 may briefly activate to obtain a movement measurement, and so on. It should be understood that it is not necessary to convey the full content captured by the smart device 22 (e.g., an image, user audio, a geolocation, etc.), but just a raw measurement from an environmental perspective (e.g., a brightness level, a face count, a noise level, an indication of significant movement, etc.).

The environmental conditions may be static (i.e., consistent hour to hour, day to day, etc.). Alternatively, such aspects may change over time (e.g., to do mobility of the smart device 22, camera orientation, time of day, number of people in the vicinity, and so on). Regardless of such variability or lack thereof, the environmental conditions can affect the accuracy of the various available authentication methods.

For example, suppose that the smart device 22 is a smart phone or a tablet which is equipped with a variety of biometric sensing capabilities such as a camera, a microphone, a touch pad, an accelerometer, and so on. If the user 30 uses the smart device 22 to authenticate and strong background noise is detected using the microphone (e.g., due to loud music, a crowd in the vicinity, street noise, etc.), then a score for voice recognition will indicate that voice recognition is less preferred (also see the smart device 22(1) in FIG. 1 and see FIG. 3).

However, suppose that the smart device 22 is a smart phone and the user 30 is currently in a strong over-illuminated environment (e.g., facing the sun) but with low background noise (see the smart device 22(2) in FIG. 1 and see FIG. 3). In this situation, the scores may indicate that voice recognition is preferred over facial recognition.

As a further example, suppose that the user 30 and the smart device 22 reside in a moving vehicle, and that the smart device 22 is a tablet with a touch screen (see the smart device 22(4) in FIG. 1). In this situation, movement can be detected by measurements from an accelerometer of the smart device 22. Movement may also be detected by output from a GPS circuit of the smart device 22 if available. Here, the management server 25 may provide relatively low scores for certain authentication methods such as handwriting analysis, or typing analysis due to the sensing of such movement.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer-implemented method, comprising:
   receiving, by a processing circuitry and via a crowd-sourcing system, a ranking given by a first user describing a user experience of an authentication method, wherein the crowd-sourcing system is configured to collect rankings from multiple users;
   comparing, by the processing circuitry, the first user to a second user in order to determine if there is any similarities between the respective users;
   based on the ranking and the comparison, determining, by processing circuitry, that the authentication method is suitable for authenticating the second user; and
   providing, by the processing circuitry, a recommendation that recommends use of the authentication method for authenticating the second user.

2. An apparatus, comprising:
   a memory; and
   processing circuitry coupled to the memory, the memory storing instructions which, when executed by the processing circuitry, cause the processing circuitry to:
   receive, via a crowd-sourcing system, a ranking given by a first user describing a user experience of an authentication method, wherein the crowd-sourcing system is configured to collect rankings from multiple users;
   compare the first user to a second user in order to determine if there is any similarities between the respective users;
   based on the ranking and the comparison, determine that the authentication method is suitable for authenticating the second user; and
   provide a recommendation that recommends use of the authentication method for authenticating the second user.

3. A computer program product having a non-transitory computer-readable medium storing instructions, the instructions, when carried out by processing circuitry, causing the processing circuitry to perform a method of:

receiving, via a crowd-sourcing system, a ranking given by a first user describing a user experience of an authentication method, wherein the crowd-sourcing system is configured to collect rankings from multiple users;

comparing the first user to a second user in order to determine if there is any similarities between the respective users;

based on the ranking and the comparison, determining that the authentication method is suitable for authenticating the second user; and providing a recommendation that recommends use of the authentication method for authenticating the second user.

\* \* \* \* \*